(12) United States Patent
Kilian et al.

(10) Patent No.: US 8,020,688 B2
(45) Date of Patent: Sep. 20, 2011

(54) MECHANICAL SYSTEM FOR PROCESSING WORKPIECES

(75) Inventors: Friedrich Kilian, Leonberg/Gebersheim (DE); Harry Thonig, Neukirch (DE); Thomas Poike, Neukirch (DE)

(73) Assignee: TRUMPF Sachsen GmbH, Neukirch (DE)

( * ) Notice: Subject to any disclaimer, the term of this patent is extended or adjusted under 35 U.S.C. 154(b) by 727 days.

(21) Appl. No.: 11/949,952

(22) Filed: Dec. 4, 2007

(65) Prior Publication Data

US 2008/0172858 A1    Jul. 24, 2008

(30) Foreign Application Priority Data

Dec. 8, 2006   (EP) ..................................... 06025398

(51) Int. Cl.
    *B65G 37/00*       (2006.01)
(52) U.S. Cl. ................................................ 198/346.2
(58) Field of Classification Search ............... 198/346.2, 198/465.1, 348, 468.6; 414/222.01, 222.09, 414/222.11, 281
    See application file for complete search history.

(56) References Cited

U.S. PATENT DOCUMENTS

| | | | | |
|---|---|---|---|---|
| 4,005,786 A * | 2/1977 | Adelson et al. ............... | 414/281 |
| 4,760,671 A * | 8/1988 | Ward ............................ | 451/333 |
| 4,920,891 A * | 5/1990 | Loomer ....................... | 104/102 |
| 4,999,578 A * | 3/1991 | Ohashi et al. ................. | 324/754 |
| 5,147,176 A | 9/1992 | Stolzer et al. | |
| 5,305,892 A * | 4/1994 | Kronseder ..................... | 209/523 |
| 5,310,039 A * | 5/1994 | Butera et al. ............... | 198/346.2 |
| 5,353,495 A * | 10/1994 | Terabayashi et al. ........... | 29/714 |
| 5,669,748 A * | 9/1997 | Knudsen, Jr. ................. | 414/273 |
| 5,947,259 A * | 9/1999 | Leisner et al. ............. | 198/465.3 |
| 5,992,009 A * | 11/1999 | Bonura .......................... | 29/732 |
| 6,202,824 B1 * | 3/2001 | Goss et al. .................. | 198/346.2 |
| 6,835,040 B2 * | 12/2004 | Quiring ......................... | 414/281 |
| 7,137,769 B2 * | 11/2006 | Komatsu et al. .......... | 414/222.01 |
| 7,650,982 B2 * | 1/2010 | Tachibana et al. ....... | 198/341.01 |
| 7,743,903 B2 * | 6/2010 | Nakanishi .................. | 198/346.2 |
| 2005/0065636 A1 | 3/2005 | Lakas et al. | |
| 2005/0158154 A1 | 7/2005 | Leerintveld et al. | |

FOREIGN PATENT DOCUMENTS

DE           3810657         10/1989
(Continued)

OTHER PUBLICATIONS

Andrae et al., "Flexibles Fertigungssystem fur Bleckwerkstucke", Werkstatt und Betrieb, 122, No. 1, Jan. 1989, pp. 79-84.
"AS/RS serve as spines of European FFS", 1123 Tooling & Production, 55, No. 1, Apr. 1990, Solon, OH, USA, one page.
Search Report from corresponding European Application No. 06025398.6, mailed Jun. 1, 2007, 5 pages.

(Continued)

*Primary Examiner* — Douglas A Hess
(74) *Attorney, Agent, or Firm* — Fish & Richardson P.C.

(57) ABSTRACT

A mechanical system is provided for processing workpieces, especially metal sheets. The system has a storage side with a workpiece store, a processing side with a plurality of mechanical processing units, and a mechanical feeding device which is provided between the storage side and the processing side. The feeding device comprises a plurality of feeding units, with different feeding units of the feeding devices being associated with different processing units. The feeding units are configured to pick up work pieces at the storage side and deliver them at the processing side to the respectively associated processing unit(s). In addition or as an alternative, the feeding units may pick up workpieces at the processing side from the respectively associated processing unit(s) and deliver the workpieces at the storage side.

16 Claims, 5 Drawing Sheets

FOREIGN PATENT DOCUMENTS

| | | |
|---|---|---|
| DE | 3922964 A1 | 1/1991 |
| DE | 10017935 | 10/2001 |
| DE | 10154787 A1 | 5/2003 |
| FR | 2582242 | 11/1986 |
| FR | 2617145 | 12/1988 |

OTHER PUBLICATIONS

English translation of Andrae et al., "Flexibles Fertigungssystem fur Bleckwerkstucke", Werkstatt und Betrieb, 122, No. 1, Jan. 1989, pp. 79-84.

\* cited by examiner

MECHANICAL SYSTEM FOR PROCESSING WORKPIECES

CROSS REFERENCE TO RELATED APPLICATION

This application claims priority under 35 U.S.C. §119(a) from European Patent Application No. 06 025 398.6, filed Dec. 8, 2006, the entire contents of which are hereby incorporated by reference.

TECHNICAL FIELD

This invention relates to a mechanical system for processing workpieces, especially metal sheets.

BACKGROUND

A mechanical system for processing workpieces, especially metal sheets, having a storage side, which comprises (a) a workpiece store, (b) a processing side, which has a plurality of mechanical processing units, and (c) a mechanical feeding device between the storage side and the processing side is disclosed in US 2003/0091423 A1. In this system the feeding device allows workpieces to be picked up at the storage side and delivered at the processing side and/or picked up at the processing side and delivered at the storage side. A storage rack is provided in which the metal sheets that are to be processed are stored. Processing of the workpieces is performed by means of processing machines, especially by means of laser cutting machines, which are arranged in succession in the direction of movement of the feeding device. All the processing machines of this system are served by the feeding device. By means of the feeding device, metal sheets to be processed are taken out of the storage rack, then transported to the relevant processing machine and finally transferred back to the storage rack.

SUMMARY

The mechanical systems disclosed herein exhibit good efficiency.

In the systems disclosed herein, viewed in the direction of material flow, a plurality of feeding units which are respectively associated with different processing units of the processing side are provided between the storage side and the processing side of the system. Individual processing units may consequently be operated independently of one another. For example, a plurality of processing units may be fed simultaneously with workpieces to be processed. In addition or as an alternative, it is possible for processed workpieces to be simultaneously removed from a plurality of processing units and simultaneously delivered at the storage side. All in all, it is possible to achieve high workpiece throughputs with the systems disclosed herein. In particular, high-speed, multiple machine operation may be achieved.

Accordingly, in one aspect, the invention features a mechanical system for processing workpieces, for example metal sheets, that includes: (a) a storage side, comprising a workpiece store with a plurality of storage units, (b) a processing side, comprising a plurality of mechanical processing units, (c) a mechanical feeding device, provided between the storage side and the processing side, which comprises a plurality of feeding units configured to move workpieces between the storage side and the processing side, (d) system modules, each system module comprising, in association with each other, one or more of the storage units of the workpiece store, one or more of the processing units of the processing side, and one or more of the feeding units of the feeding device, wherein the feeding units of the system modules are provided between associated storage units and processing units and are configured to move the workpieces between the storage side and the processing side of the relevant system module, and (e) a transfer device, disposed between the feeding units or storage units of different system modules, the transfer device being configured to transfer the workpieces to and/or from the feeding units and/or the storage units of the different system modules.

Thus, the systems have a modular structure. Each system module comprises, on the storage side, at least one storage unit, and, on the processing side, at least one processing unit, and between these units at least one feeding unit. Owing to the modular concept, systems according to the invention may be adapted in a simple manner to the requirements of the particular operator of the system. Flexibility may be obtained, in particular, with regard to the workpiece throughput of the system in terms of quantity and also with regard to the types of processing that can be performed with the system.

The transfer device interconnects feeding units associated with different processing units and/or interconnects storage units associated with different processing units. The transfer device may be used to distribute workpieces to be processed to different processing units. In addition or as an alternative, the transfer device permits the transport paths of processed workpieces coming from different processing units to be brought together. Workpieces to be fed to a processing unit may be transferred by the transfer device directly to the feeding unit associated with the processing unit. Workpieces may, however, also be transferred to a storage unit associated with the processing unit, from which storage unit the workpieces are then taken by the relevant feeding unit. Correspondingly, processed workpieces may pass from the feeding unit of the relevant processing unit to the transfer device directly or via the associated storage unit. In each case, the transfer device allows the individual processing units to be operated in coordination with one another.

For use of the systems disclosed herein at a factory level it is especially advantageous that workpieces be transferable by means of the transfer device between feeding units that are associated with different processing units and/or between storage units that are associated with different processing units. In that case, the transfer device is able, in particular, to take over some of the movement of workpieces that is required for multiple processing of workpieces.

In some implementations, the workpiece store is in the form of a rack storage system, for example with storage units in the form of rack units.

Rack storage and retrieval devices may be provided as feeding units.

A space-saving configuration of the arrangement as a whole is obtained if the transfer device is accommodated within the floor space area of the workpiece store, for example a rack storage system.

The transfer device may comprise at least one transfer unit, which is movable with a transfer movement and in so doing is preferably guided on the workpiece store, for example on a rack storage system.

The workpieces stored or temporarily held on the storage side of the system are preferably placed on pallets. The workpiece store of the system is therefore in some cases in the form of a pallet store.

The details of one or more embodiments are set forth in the accompanying drawings and the description below. Other features and advantages of the invention will be apparent from the description and drawings, and from the claims.

DETAILED DESCRIPTION

Figure 1:
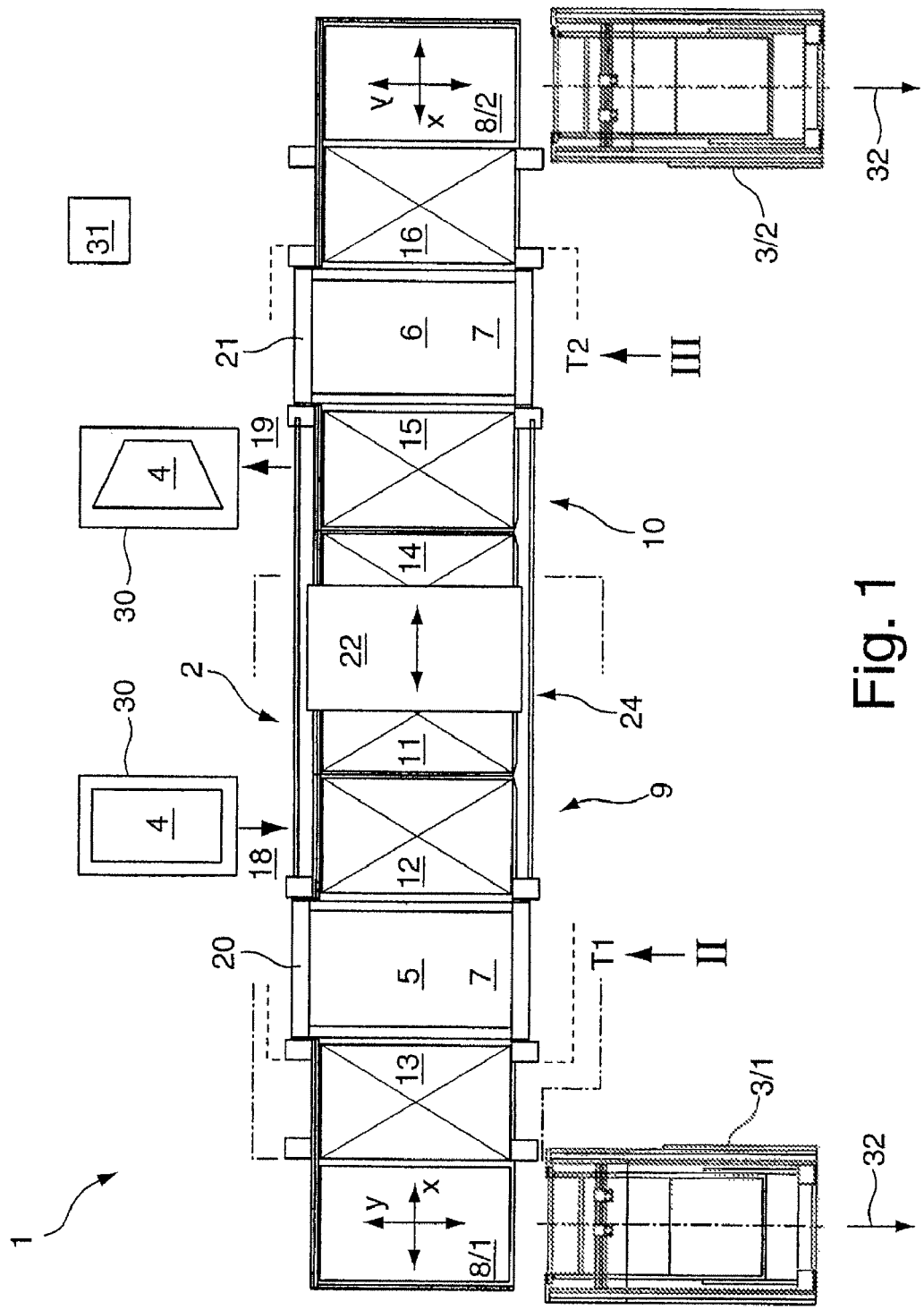
FIG. 1 is a highly schematic plan view of a mechanical system of a first type for the processing of metal sheets.

As shown in FIG. 1, a mechanical system 1 for processing workpieces comprises a workpiece store 2 and also processing units in the form of a first processing machine 3/1 and a second processing machine 3/2. In the example illustrated, the mechanical system 1 serves to process metal sheets 4 by cutting.

A first feeding unit 5 of the mechanical system 1 is provided between the workpiece store 2 and the first processing machine 3/1 in the direction of material flow. Correspondingly, the mechanical system 1 has a second feeding unit 6 between the workpiece store 2 and the second processing machine 3/2. The feeding units 5, 6 form part of a feeding device 7.

Further components of the mechanical system 1 are a first workpiece changer 8/1 between the first feeding unit 5 and the first processing machine 3/1, and a second workpiece changer 8/2 between the second feeding unit 6 and the second processing machine 3/2.

The processing machines 3/1, 3/2 are flat-bed laser machines of the conventional type for processing sheet metal by cutting. Similarly of the customary type are the first workpiece changer 8/1 and the second workpiece changer 8/2. The two workpiece changers 8/1, 8/2 comprise a workpiece support on which the relevant metal sheet 4 remains during processing. Both the first workpiece changer 8/1 and the second workpiece changer 8/2 are movable in two movement directions x and y extending perpendicular to each other.

Figure 2:
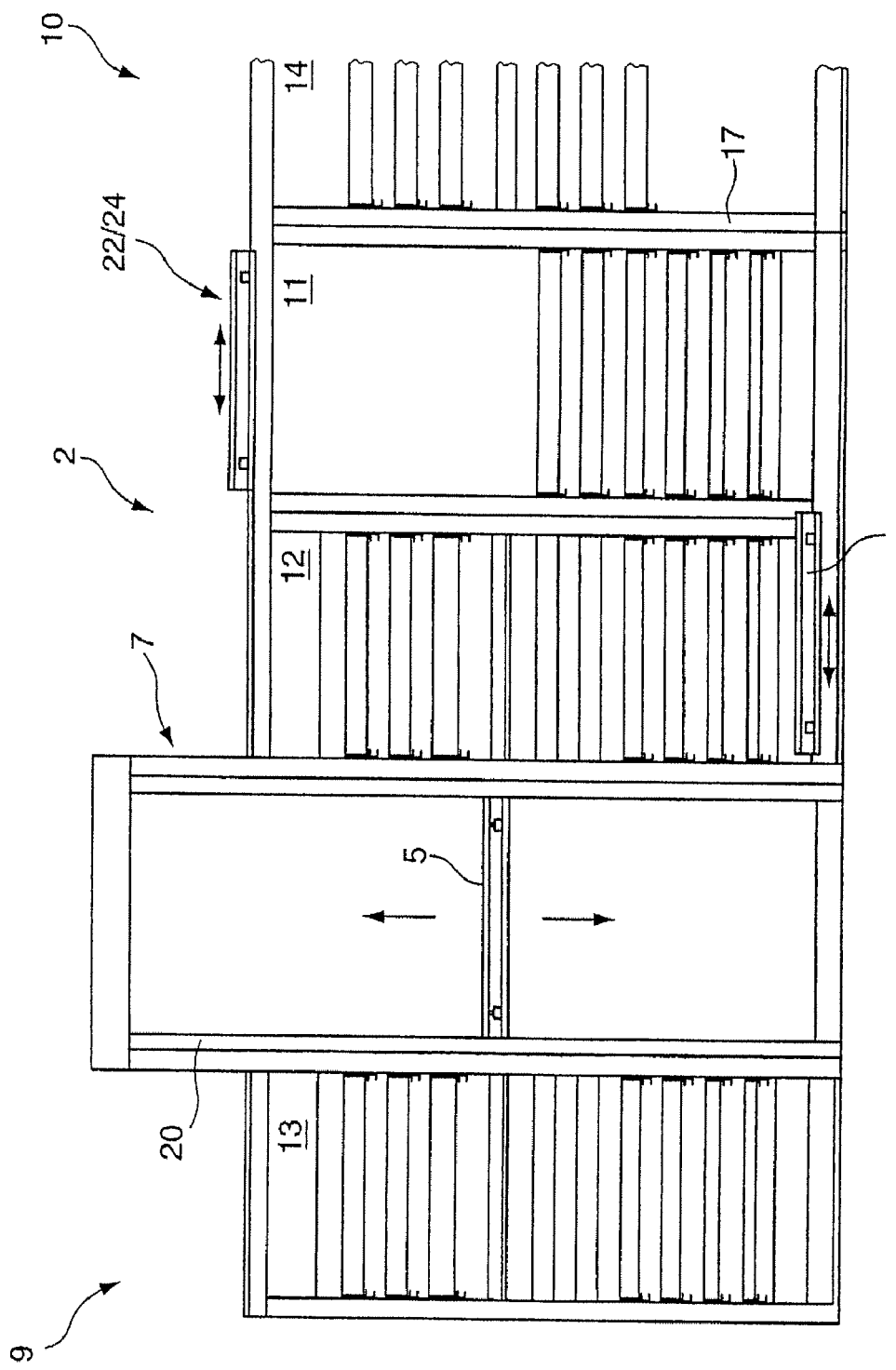
FIG. 2 is a highly schematic illustration of the part T1, defined by a dot-dash line, of the mechanical system of FIG. 1, viewed in the direction of the arrow II in FIG. 1.
Figure 3:
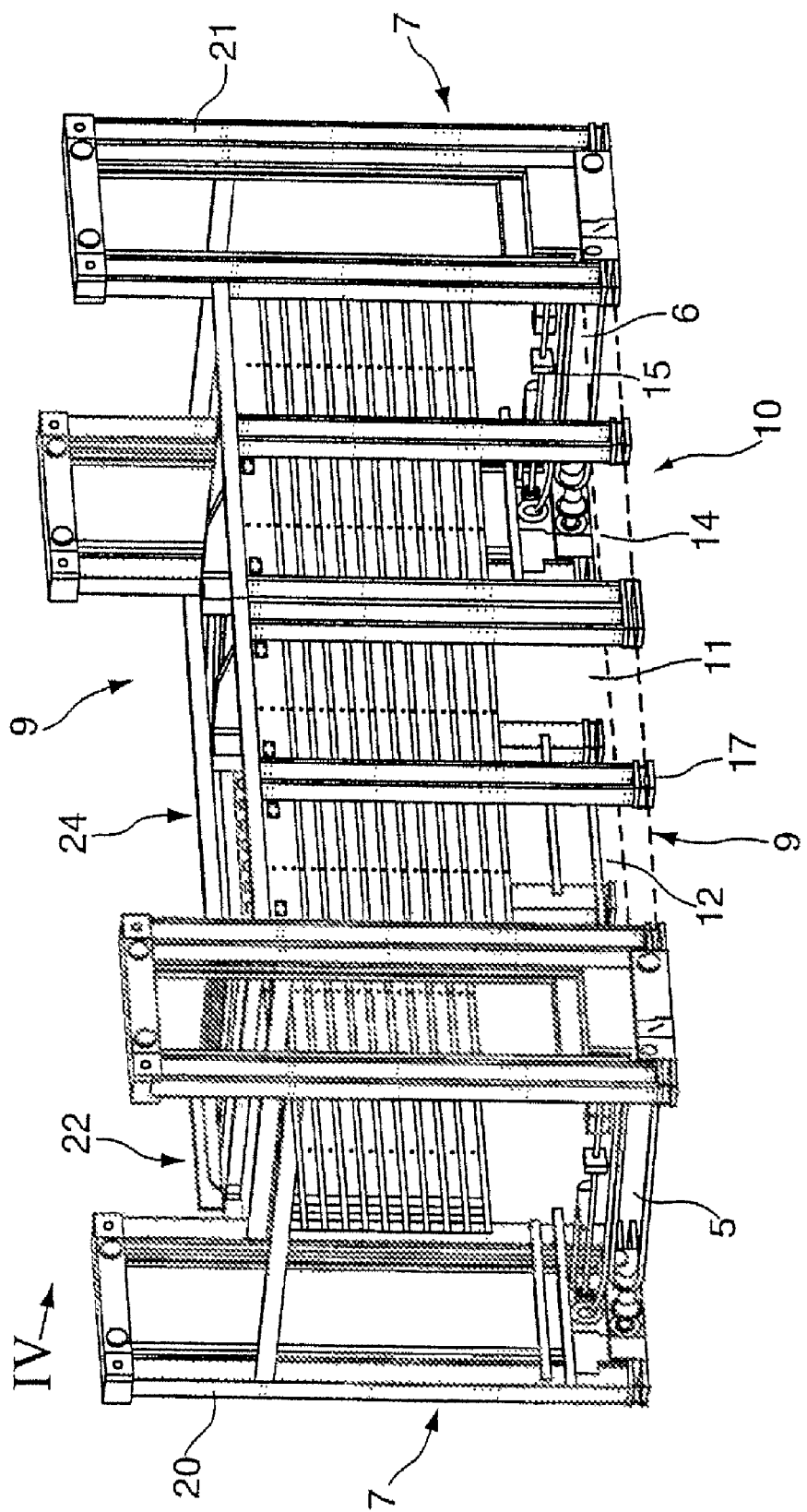
FIG. 3 shows the part T2, defined by a dashed line, of the mechanical system of FIG. 1, showing construction details and viewed in the direction of the arrow III in FIG. 1.

In the implementation shown in FIGS. 2 and 3, the workpiece store 2 is in the form of a rack storage system. Workpiece store 2 is composed of a first storage unit 9, constructed in the form of a rack unit, and a similar second storage unit 10 (FIG. 1). The first storage unit 9 in turn comprises storage racks 11, 12, 13, and the second storage unit 10 comprises storage racks 14, 15, 16. Each of the storage racks 11, 12, 13, 14, 15, 16 is equipped in the familiar manner with a plurality of pallet storage locations arranged one above another in the vertical direction on a frame 17 of the workpiece store 2. A workpiece entrance 18 of the workpiece store 2 is provided at the storage rack 12 of the first storage unit 9; a workpiece exit 19 of the workpiece store 2 is situated at the storage rack 15 of the second storage unit 10 (FIG. 1).

Conventional, motor-driven rack storage and retrieval devices form the first feeding unit 5 and the second feeding unit 6. Referring again to FIGS. 2 and 3, the first feeding unit 5 is displaceable in the vertical direction on a support structure 20 of the feeding unit 7, and the second feeding unit 6 is displaceable in the vertical direction on a support structure 21 of the feeding unit 7. The two support structures 20, 21 are integrated into the workpiece store 2. The support structure 20, with the first feeding unit 5, is situated between the storage racks 12, 13 of the first storage unit 9. The support structure 21, with the second feeding unit 6, is installed between the storage racks 15, 16 of the second storage unit 10.

Associated with one another, on the one hand, are the storage unit 9, the feeding unit 5, the workpiece changer 8/1 and the processing machine 3/1, and, on the other hand, the storage unit 10, the feeding unit 6, the workpiece changer 8/2 and the processing machine 3/2. In that respect, the mechanical system 1 is of a symmetrical construction. The mutually associated components of the system form in each case a system module.

An upper transfer unit 22 and a lower transfer unit 23 of a transfer device 24 are displaceable by motor drive in the horizontal direction on the frame 17 of the workpiece store 2. The transfer device 24 forms a connection between the two modules of the mechanical system 1. Details of the upper transfer unit 22 can be seen in FIGS. 4 and 5. The lower transfer unit 23 is indicated in FIG. 2, but for simplicity is not shown in FIG. 3. It is identical in construction to the upper transfer unit 22.

If the storage racks 11, 12, 13, 14, 15, 16 are extended in height in order to expand the capacity of the mechanical system 1, the transfer unit 22 may, if necessary, remain in its originally installed position and have the additional rack compartments built over it in a simple manner. In the extended workpiece store 2, the transfer unit 22 will in that case be situated at an intermediate level of the rack storage system.

Figure 4:
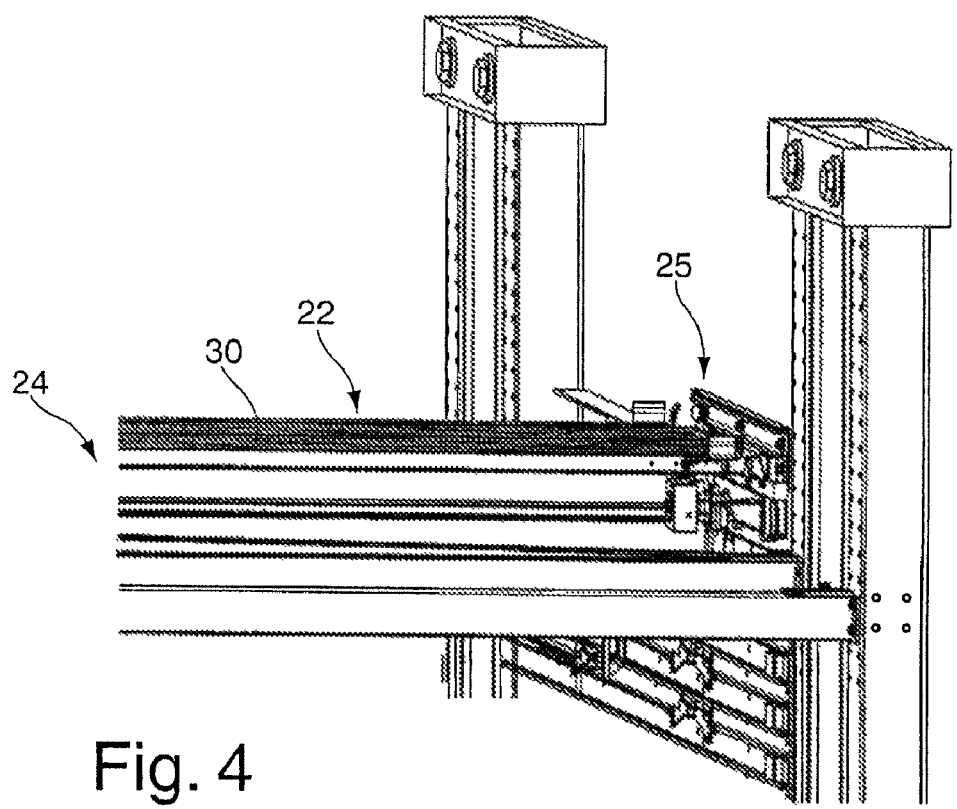
FIG. 4 shows part of the arrangement shown in FIG. 3, viewed in the direction of the arrow IV in FIG. 3.
Figure 5:
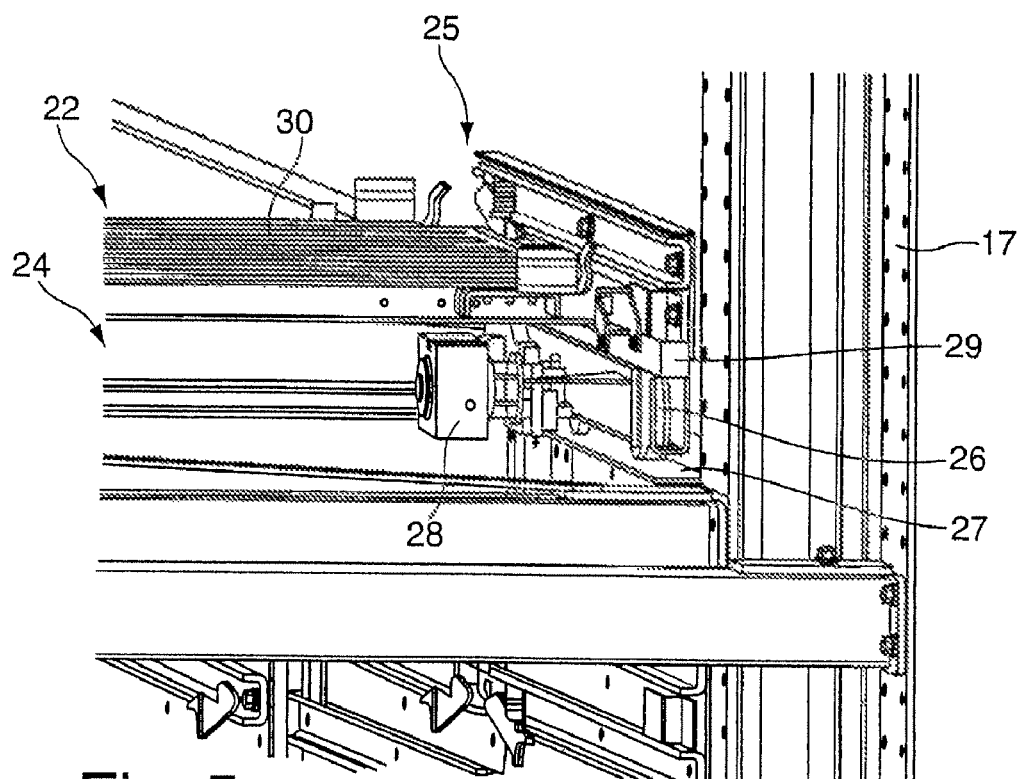
FIG. 5 shows a detail of FIG. 4 on an enlarged scale.

As shown in FIGS. 4 and 5, the two transfer units 22, 23 each comprise a transfer carriage 25 which moves by rollers 26 on runners 27 of the transfer device 24. The runners 27 of the transfer device 24 are bolted to the frame 17 of the workpiece store 2. To drive the transfer carriage 25, an on-board electric drive 28 is used, which is flange-mounted to a support frame 29 of the transfer carriage 25. Other types of drive, especially a pneumatic or a hydraulic drive, are possible.

The support frame 29 of the transfer carriage 25 supports a pallet 30 on which one or more metal sheets 4 may be placed. The pallet 30 may be pushed onto the support frame 29 of the transfer carriage 25 in the horizontal direction or taken down from the support frame 29 in the horizontal direction. In both cases, the pallet 30 is guided on the support frame 29 by means of conventional longitudinal guides. When pushed onto the transfer carriage 25, the pallet 30 is locked in that position. This locking takes place automatically when the pallet 30 is placed on the transfer carriage 25 and has to be released before the pallet 30 is taken off the transfer carriage 25.

All the main functions of the mechanical system 1 are numerically controlled. A programmable computer control 31 provided for that purpose is indicated in FIG. 1.

Under operating conditions, metal sheets to be processed are fed to the mechanical system 1 from the outside. For that purpose, pallets 30 with metal sheets 4 stacked thereon are delivered to the workpiece store 2 via the workpiece entrance 18. A pallet 30 loaded with workpieces that are to be processed is indicated in FIG. 1 close to the workpiece entrance 18.

Via the workpiece entrance 18, the loaded pallet 30 passes to that pallet storage location of the storage rack 12 which immediately follows the workpiece entrance 18 in the direction of material flow. The loaded pallet 30 is taken from there by the first feeding unit 5 of the feeding device 7. Further handling of the pallet 30 may be flexible.

On the one hand, it is possible for the pallet 30, together with all the metal sheets 4 placed thereon, to be stored by means of the first feeding unit 5 at one of the storage racks 11, 12, 13 of the first storage unit 9 away from the pallet storage location that immediately follows the workpiece entrance 18. The loaded pallet 30 may remain at the new pallet storage location until metal sheets 4 placed on it are to be fed to one of the processing machines 3/1, 3/2 for processing.

On the other hand, by means of a device not shown in detail, the uppermost metal sheet 4 in the stack may be taken off the pallet 30, received by the first feeding unit 5, and delivered to the workpiece changer 8/1. For that purpose, the workpiece changer 8/1 is moved in the x-direction to a loading position in which it is arranged beneath the lowermost pallet storage location of the storage rack 13. The pallet 30 may be stored, together with the remaining metal sheets 4, by the feeding unit 5 at one of the pallet storage locations of the first storage unit 9. The first workpiece changer 8/1 with the metal sheet 4 placed thereon travels from the loading position beneath the storage rack 13 in the direction of the x axis to the position shown in FIG. 1. From there, the loaded workpiece changer 8/1 together with the metal sheet 4 to be processed is moved in the y-direction into the working area of the first processing machine 3/1. The metal sheet placed on the workpiece changer 8/1 is then processed. Processing waste is removed at the processing machine 3/1. This waste removal is indicated in FIG. 1 by an arrow 32. The finished part produced in the processing operation remains on the workpiece changer 8/1. The latter is moved together with the finished part placed thereon to its unloading position, which corresponds to the above-described loading position.

After storing the pallet 30 loaded with the remainder of the metal sheets 4 to be processed, the first feeding unit 5 takes an empty pallet 30 or a pallet 30 already loaded with finished parts out of one of the storage racks 11, 12, 13. Pallets 30 in storage rack 11 are especially also accessible to the feeding unit 5, even though the storage rack 11 is not directly adjacent to the feeding unit 5.

During processing of a workpiece by means of the first processing machine 3/1, the first feeding unit 5 travels with the empty pallet 30 or with the pallet 30 loaded with finished parts to a position in which the finished part pallet 30 picked up by the first feeding unit 5 can be loaded with the finished part placed on the workpiece changer 8/1 which is in the unloading position. After transfer of that finished part, the pallet 30 loaded with one or more finished parts can be stored by means of the first feeding unit 5 in one of the storage racks 11, 12, 13 of the first storage unit 9.

Alternatively, the first feeding unit 5 may transfer the pallet 30 loaded with finished parts to the upper transfer unit 22 or to the lower transfer unit 23 of the transfer device 24. For that purpose, the first feeding unit 5 is to be moved in the vertical direction to an appropriate transfer position. After accepting the pallet 30 loaded with one or more finished parts, the upper transfer unit 22 or the lower transfer unit 23 travels in the horizontal direction to a transfer position above or below the storage rack 15 of the second storage unit 10. From there, the second feeding unit 6 accepts the pallet 30 loaded with at least one finished part. The second feeding unit 6 then travels together with the pallet 30 that it has accepted to the level of that pallet storage location of the storage rack 15 which, in the direction of material flow, is immediately in front of the workpiece exit 19 of the workpiece store 2. From that pallet storage location, the pallet 30 loaded with one or more finished parts is finally discharged from the workpiece store 2 (FIG. 1).

As a departure from the sequences described above, after being taken from the pallet storage location immediately following the workpiece entrance 18, the pallet 30 loaded with workpieces to be processed may be moved by appropriate vertical displacement of the first feeding device 5 to the level of the upper transfer unit 22 or the lower transfer unit 23 of the transfer device 24. The pallet 30 loaded with the workpieces to be processed is then transferred to the upper transfer unit 22 or to the lower transfer unit 23. The upper transfer unit 22 or the lower transfer unit 23 then travels, together with the pallet 30 and the workpieces placed thereon, in the horizontal direction until it is situated respectively above or below the storage rack 15 of the second storage unit 10. From there, the pallet 30 loaded with the workpieces to be processed is accepted by the second feeding unit 6. By means of the second feeding unit 6 the pallet 30, together with all the workpieces placed thereon, is then stored in one of the storage racks 14, 15, 16 of the second storage unit 10. Alternatively, it is possible to transfer one of the metal sheets 4 to be processed to the workpiece changer 8/2 in the manner described above and to transport it, with appropriate displacement of the workpiece changer 8/2, into the working area of the processing machine 3/2, where workpiece processing then takes place.

After the metal sheet 4 to be processed has been removed, the second feeding unit 6 stores the pallet 30 with the remainder of the workpieces to be processed in one of the storage racks 14, 15, 16 of the second storage unit 10. The second feeding unit 6 then accepts an empty pallet 30 or a pallet 30 already loaded with finished parts from one of the storage racks 14, 15, 16 of the second storage unit 10. The finished part produced on the second processing machine 3/2 is then placed on that pallet 30 in the manner described above. The second feeding unit 6 then transports the pallet 30 loaded with at least one finished part to that pallet storage location of the storage rack 15 which is immediately in front of the workpiece exit 19. The pallet 30 loaded with the finished part(s) is finally removed from the workpiece store 2 via the workpiece exit 19.

While the upper transfer unit 22 or the lower transfer unit 23 is traveling, together with the finished part pallet 30 or with the pallet 30 loaded with metal sheets 4 to be processed, to the second feeding unit 6, the first feeding unit 5 may already pick up at the workpiece entrance 18 the next pallet 30 with metal sheets 4 that are yet to be processed. Since the first transfer unit 22 and the second transfer unit 23 travel outside the region of movement of the feeding units 5, 6, the transfer units 22, 23, on the one hand, and the feeding units 5, 6, on the other hand, may be operated independently of one another without any fear of collision.

The sequences described above are of a merely illustrative nature. Modifications of the material flow illustrated are possible. The aim is to optimize the workpiece throughput obtainable on the mechanical system 1.

Suitable sequences also include, for example, transfer of work pieces processed on one of the processing machines 3/1, 3/2 to the respective other processing machine 3/1, 3/2, at which a second workpiece-processing operation or finishing of the workpiece is performed. For that purpose, the metal sheet 4 that has undergone the first processing operation is transferred from the relevant workpiece changer 8/1, 8/2 to a pallet 30 on the feeding unit 5, 6 that is associated with the processing machine 3/1, 3/2 used for the first processing operation. From the feeding unit 5, 6, the pallet 30 loaded with the metal sheet that has undergone the first processing operation is accepted by one of the transfer units 22, 23 of the transfer device 24. From the relevant transfer unit 22, 23 of the transfer device 24, the pallet 30 with the metal sheet 4 that has undergone the first processing operation is then taken to the processing machine 3/1, 3/2 provided for the second processing operation. The finished workpiece is finally transported in the manner described above to the workpiece exit 19 of the workpiece store 2 and is there removed from the workpiece store 2.

Figure 6:
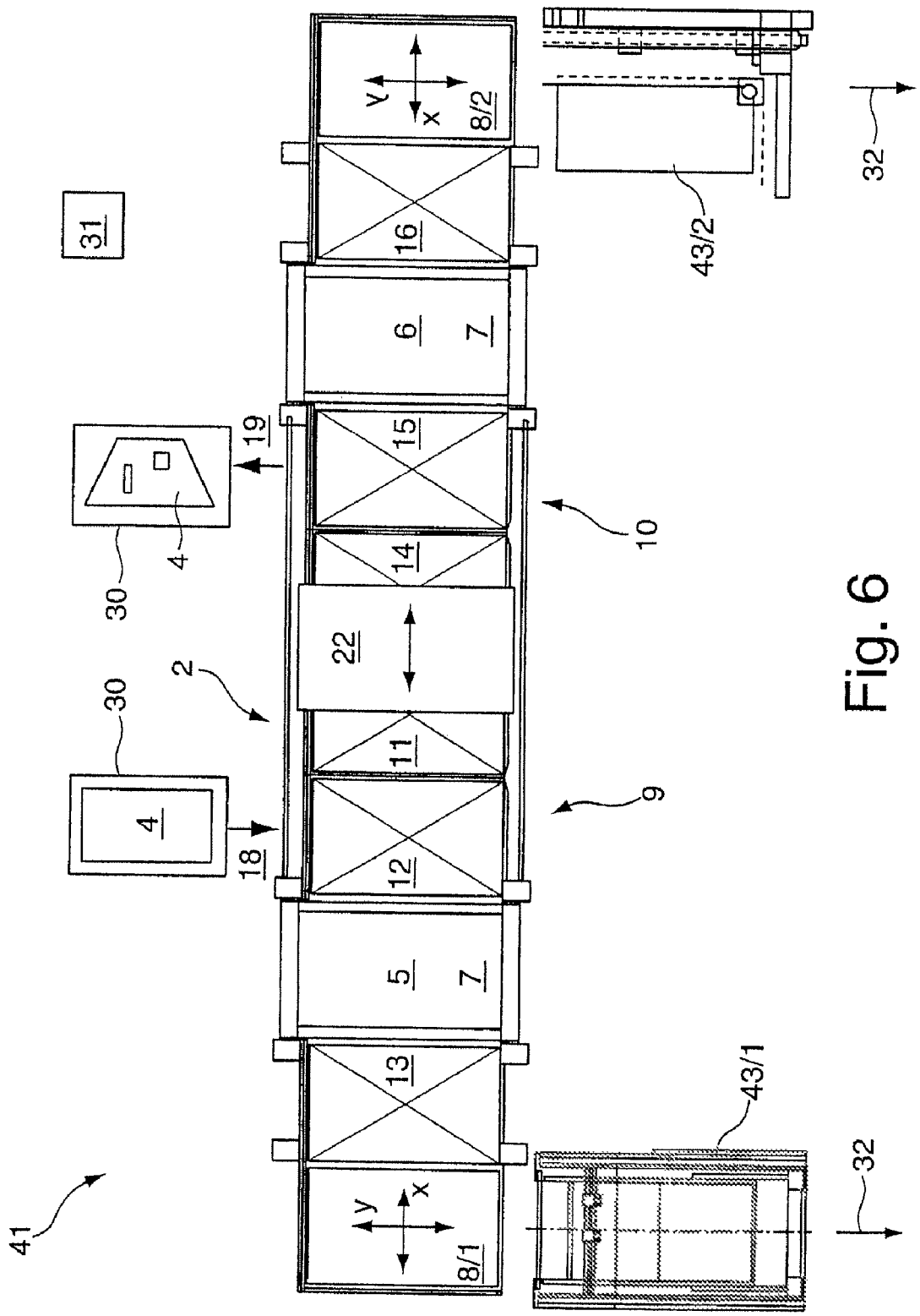
FIG. 6 is an illustration corresponding to FIG. 1, showing a mechanical system of a second type for the processing of metal sheets.

Whereas the mechanical system 1 shown in FIGS. 1 to 5 has processing machines 3/1, 3/2 by means of which the same type of processing may be carried out, a mechanical system 41 illustrated in FIG. 6 has processing machines 43/1, 43/2 for different types of material-processing operations.

The processing machine 43/1 is a flat-bed laser machine for processing sheet metal by cutting, while the second processing machine 43/2 is a combination machine comprising a punching station and a laser cutting station. The mechanical system 41 is used especially to carry out workpiece-processing operations in the course of which a first processing operation, preferably carried out with the processing machine 43/2, is followed by a second processing operation, preferably carried out by the processing machine 43/1. The transfer of workpieces between the processing machines 43/1, 43/2 is in that case carried out by means of the transfer device 24 in the manner described above.

A number of embodiments have been described. Nevertheless, it will be understood that various modifications may be made without departing from the spirit and scope of the invention. Accordingly, other embodiments are within the scope of the following claims.

What is claimed is:

1. A mechanical system for processing workpieces, the systems comprising:
    a storage side, comprising a workpiece store with a plurality of storage units,
    a processing side, comprising a plurality of mechanical processing units,
    a mechanical feeding device, provided between the storage side and the processing side, which comprises a plurality of feeding units configured to move workpieces between the storage side and the processing side,
    system modules, each system module comprising, in association with each other, one or more of the storage units of the workpiece store, one or more of the processing units of the processing side, and one or more of the feeding units of the feeding device, wherein the feeding units of the system modules are provided between associated storage units and processing units and are configured to move the workpieces between the storage side and the processing side of the relevant system module, and
    a transfer device, disposed between the feeding units or storage units of different system modules, the transfer device being configured to transfer the workpieces to and/or from the feeding units and/or the storage units of the different system modules and being provided within the floor space area of the storage units of the system modules.

2. A mechanical system according to claim 1, wherein the transfer device is configured to transfer the workpieces between feeding units associated with different processing units and/or between storage units associated with different processing units.

3. A mechanical system according to claim 1, wherein the workpiece store is in the form of a rack storage system.

4. A mechanical system according to claim 3, wherein the storage units are in the form of rack units.

5. A mechanical system according to claim 1, wherein the feeding devices comprise rack storage and retrieval devices.

6. A mechanical system according to claim 1, wherein the transfer device comprises at least one transfer unit which is movable between the feeding units that are associated with different processing units with a transfer movement.

7. A mechanical system according to claim 6, wherein at least one transfer unit is movably guided on the workpiece store during the transfer movement.

8. A mechanical system according to claim 1, wherein the transfer device comprises at least one transfer unit which is movable between the storage units that are associated with different processing units with a transfer movement.

9. A mechanical system according to claim 8, wherein at least one transfer unit is movably guided on the workpiece store during the transfer movement.

10. A mechanical system according to claim 1, wherein the workpiece store is in the form of a pallet store.

11. The mechanical system according to claim 1, wherein the processing units are configured to process metal sheets.

12. A method for processing workpieces, the method comprising:
    introducing a workpiece into a storage unit of a storage side of a system module of a processing system,
    using a feeding unit of a mechanical feeding device, provided between the storage side and a processing side of the system module, to move the workpiece between the storage side and the processing side, and
    using a transfer device, disposed between the system module and a second system module with a storage unit and being provided within the floor space area of the storage units of the system modules, to transfer the workpiece to a feeding unit and/or the storage unit of the second system module.

13. The method of claim 12, further comprising using the transfer device to transfer the workpiece from the processing side of the system module to the processing side of the second system module.

14. The method of claim 13, further comprising performing a first processing step at the processing side of the system module and a second processing step at the processing side of the second system module.

15. The method of claim 12, further comprising using the transfer device to move the workpiece to a position at which the workpiece can be removed from the processing system.

16. A mechanical system for processing workpieces, the system comprising:
    a workpiece store with a plurality of storage units,
    a plurality of mechanical processing units,
    a mechanical feeding device, comprising a plurality of feeding units configured to move workpieces between the workpiece store and one or more of the processing units,
    the storage units, mechanical processing units, and feeding units being associated with each other to define a plurality of system modules, each system module comprising one or more of the storage units of the workpiece store, one or more of the processing units of the processing side, and one or more of the feeding units of the feeding device, wherein, in each system module, at least one feeding unit is provided between an associated storage unit and an associated processing unit and is configured to move the workpieces between the associated storage unit and the associated processing unit, and
    a transfer device, disposed between the system modules, the transfer device being configured to transfer the workpieces between the different system modules and being provided within the floor space area of the storage units of the system modules.

* * * * *